(12) United States Patent
Kitora (10) Patent No.: US 10,193,420 B2
(45) Date of Patent: Jan. 29, 2019

(54) ROTATING ELECTRIC MACHINE (71) Applicant: Mitsubishi Electric Corporation, Tokyo (JP)

(72) Inventor: Ryuichi Kitora, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 626 days.

(21) Appl. No.: 14/851,221

(22) Filed: Sep. 11, 2015

(65) Prior Publication Data

US 2016/0308406 A1 Oct. 20, 2016

(30) Foreign Application Priority Data

Apr. 16, 2015 (JP) .................................. 2015-084137

(51) Int. Cl.
*H02K 9/22* (2006.01)
*H02K 3/52* (2006.01)
*H02K 9/00* (2006.01)

(52) U.S. Cl.
CPC ............... *H02K 9/22* (2013.01); *H02K 3/522* (2013.01); *H02K 2203/09* (2013.01)

(58) Field of Classification Search
CPC .. H02K 5/22; H02K 5/18; H02K 5/20; H02K 9/22; H02K 9/00; H02K 9/19; H02K 2203/09
See application file for complete search history.

(56) References Cited

U.S. PATENT DOCUMENTS 3,043,969 A * 7/1962 Petersen ................... H02K 9/22
310/260
3,075,103 A * 1/1963 Ward, Jr. ................. H02K 9/19
310/260

(Continued)

FOREIGN PATENT DOCUMENTS

CN 104508949 A 4/2015
DE 102015219476 A1 * 12/2016 ............... H02K 9/22

(Continued)

OTHER PUBLICATIONS

Communication dated Nov. 10, 2015 from the Japanese Patent Office in counterpart application No. 2015-084137.

(Continued)

*Primary Examiner* — Edgardo San Martin
(74) *Attorney, Agent, or Firm* — Sughrue Mion, PLLC; Richard C. Turner (57) ABSTRACT

Provided is a rotating electric machine capable of improving heat dissipation from each of busbars to achieve a higher output. The rotating electric machine includes: a stator core (8); a frame (3); coil portions; a plurality of busbars (18, 19, 20) arranged on one end surface side of the stator core (8), which are to be electrically connected to the coil portions to distribute electric power to the coil portions; a holder (17); and a plate (24) having one end portion facing at least one of the plurality of busbars (18, 19, 20) and another end portion exposed externally from the holder (17) to be held in contact with an outer circumferential surface of a jacket (4). The plate (24) guides heat of the plurality of busbars (18, 19, 20) from the one end portion to the another end portion.

10 Claims, 6 Drawing Sheets

(56) References Cited

U.S. PATENT DOCUMENTS

| | | | | |
|---|---|---|---|---|
| 4,538,169 A * | 8/1985 | Smith | .................... | H01L 23/367 |
| | | | | 257/717 |
| 5,712,517 A * | 1/1998 | Schmidt | ................ | H01L 25/112 |
| | | | | 257/E25.025 |
| 6,989,617 B1 * | 1/2006 | Vandenbossche | ..... | H02K 5/141 |
| | | | | 310/227 |
| 7,378,766 B2 * | 5/2008 | Vasilescu | ............ | F28D 15/0233 |
| | | | | 310/58 |
| 7,709,979 B2 * | 5/2010 | Michel | ................ | F28D 15/0275 |
| | | | | 310/52 |
| 8,633,620 B2 * | 1/2014 | Kimmich | ............... | H02K 5/225 |
| | | | | 310/52 |
| 8,698,361 B2 * | 4/2014 | Stiesdal | ................. | H02K 1/148 |
| | | | | 310/52 |
| 9,025,336 B2 * | 5/2015 | Minato | ................ | H01L 21/561 |
| | | | | 361/730 |
| 9,203,271 B2 * | 12/2015 | Inoue | .................... | H02K 9/193 |
| 9,203,288 B2 * | 12/2015 | Kato | ................. | H02K 11/0073 |
| 9,325,224 B2 * | 4/2016 | Vander Lind | ............ | H02K 1/30 |
| 9,660,503 B2 * | 5/2017 | Koga | ........................ | H02K 9/08 |
| 9,882,444 B2 * | 1/2018 | Murakami | ............... | H02K 3/28 |
| 2003/0173839 A1 * | 9/2003 | Torii | ........................ | H02K 5/20 |
| | | | | 310/52 |
| 2016/0020658 A1 * | 1/2016 | Tamura | .................... | H02K 9/19 |
| | | | | 310/54 |
| 2016/0020678 A1 * | 1/2016 | Hirano | .................... | H02K 5/18 |
| | | | | 310/64 |

FOREIGN PATENT DOCUMENTS

| | | | | |
|---|---|---|---|---|
| GB | 926186 A | * | 5/1963 | ............... H02K 9/22 |
| JP | 2006-158199 A | | 6/2006 | |
| JP | 2009-100628 A | | 5/2009 | |
| JP | 5094505 B2 | | 12/2012 | |
| JP | 2014-158366 A | | 8/2014 | |

OTHER PUBLICATIONS

Communication dated Dec. 28, 2017, issued by the State Intellectual Property Office of People's Republic of China in counterpart application No. 201510884447.4.

* cited by examiner

ROTATING ELECTRIC MACHINE

BACKGROUND OF THE INVENTION

1. Field of the Invention

The present invention relates to a rotating electric machine including a plurality of busbars arranged on one end surface side of a stator core over an entire circumference thereof, for distributing electric power to coil portions of a plurality of phases.

2. Description of the Related Art

Hitherto, there is known a rotating electric machine including a stator core arranged to surround an outer circumferential surface of a rotor, a frame having an annular shape arranged to surround the stator core, coil portions of a plurality of phases, which are wound around the stator core, and a plurality of busbars arranged on one end surface side of the stator core over an entire circumference thereof, which are to be electrically connected to the coil portions of the plurality of phases to distribute electric power to the coil portions of the plurality of phases (see Japanese Patent No. 5094505 and Japanese Patent Application Laid-open No. 2006-158199, for example).

In the rotating electric machines disclosed in Japanese Patent No. 5094505 and Japanese Patent Application Laid-open No. 2006-158199, however, countermeasures to improve heat dissipation from each of the busbars that distribute the electric power to the coil portions of the plurality of phases have not been taken, which disadvantageously becomes an obstacle to achieve a higher output.

SUMMARY OF THE INVENTION

The present invention has been made to solve the problem described above, and has an object to provide a rotating electric machine capable of improving heat dissipation from each of busbars to achieve a higher output.

According to one embodiment of the present invention, there is provided a rotating electric machine, including:

a stator core arranged to surround an outer circumferential surface of a rotor;

a frame having an annular shape arranged to surround the stator core;

coil portions of a plurality of phases, which are wound around the stator core;

a plurality of busbars arranged on one end surface side of the stator core over an entire circumference thereof, which are to be electrically connected to the coil portions of the plurality of phases to distribute electric power to the coil portions of the plurality of phases;

a holder for accommodating the plurality of busbars therein; and a plate having one end portion facing at least one of the plurality of busbars and another end portion exposed externally from the holder on an outer diameter side of the frame, the plate guiding heat of the plurality of busbars from the one end portion to the another end portion.

The rotating electric machine according to the one embodiment of the present invention includes the plate having the one end portion facing at least one of the plurality of busbars and the another end portion exposed externally from the holder on the outer diameter side of the frame, for guiding the heat of the plurality of busbars from the one end portion to the another end portion. Therefore, the heat dissipation from the busbars is improved.

DETAILED DESCRIPTION OF THE PREFERRED EMBODIMENTS

First Embodiment

Figure 1:
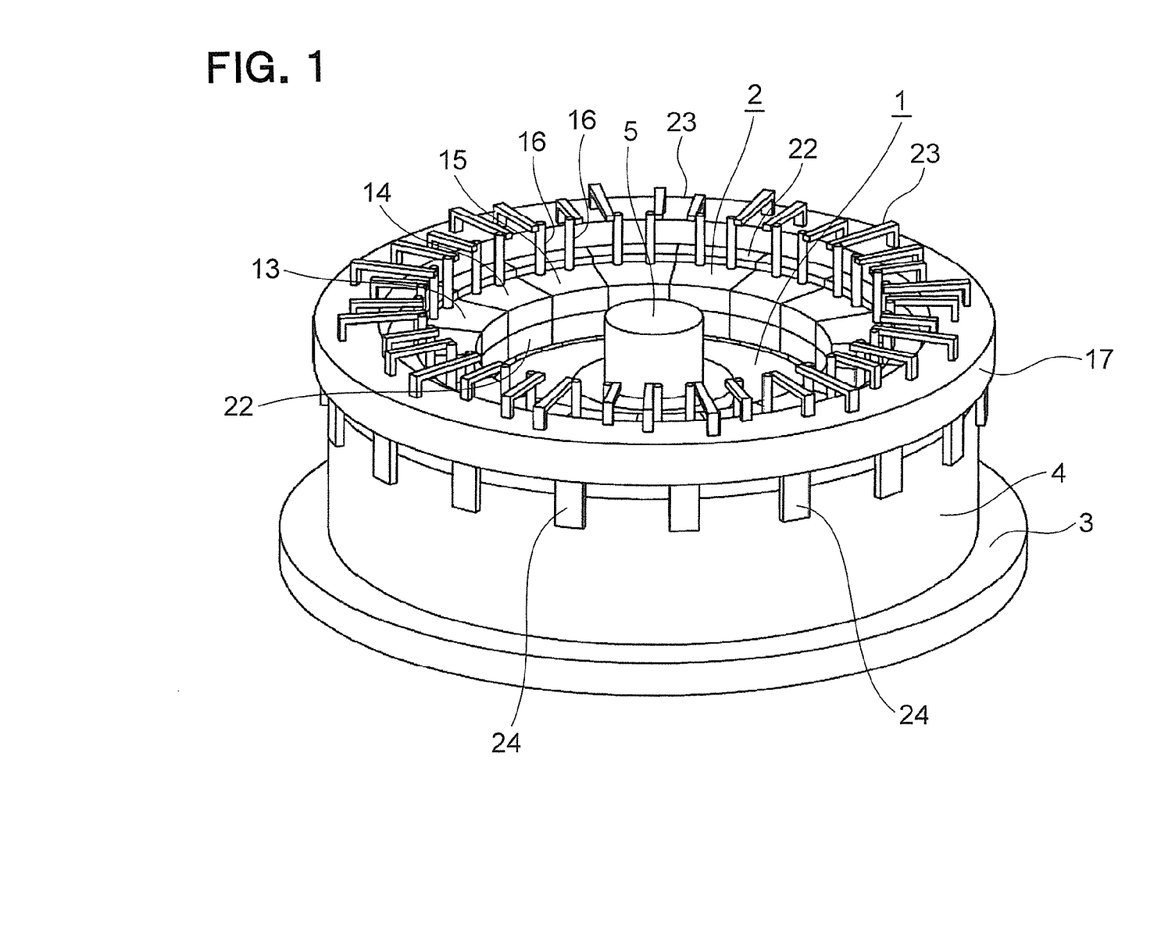
FIG. 1 is a perspective view for illustrating an electric motor according to a first embodiment of the present invention.
Figure 2:
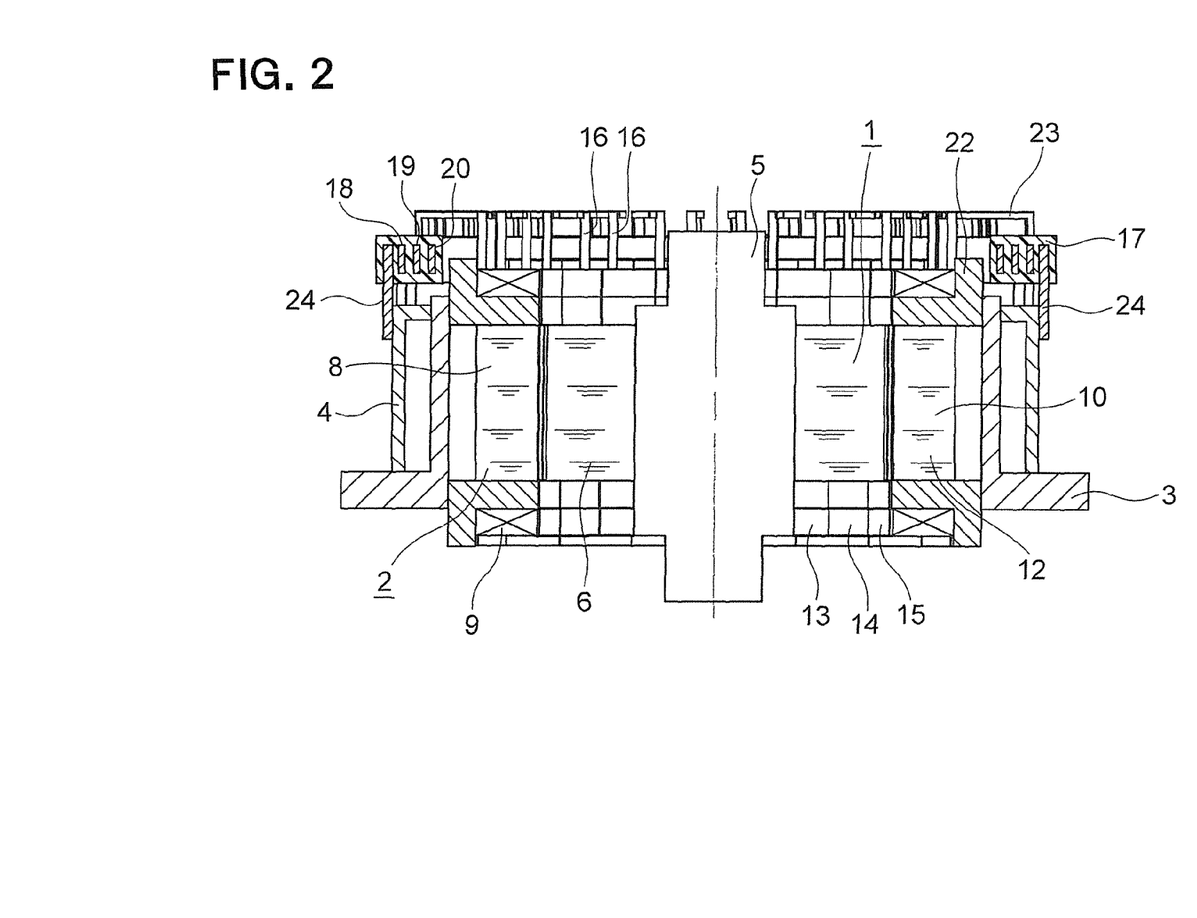
FIG. 2 is a front sectional view of the electric motor illustrated in FIG. 1.

FIG. 1 is a perspective view for illustrating an electric motor according to a first embodiment of the present invention, and FIG. 2 is a front sectional view of the electric motor illustrated in FIG. 1. The electric motor is an inner-rotor type three-phase brushless electric motor that is mounted in the vicinity of a wheel of an electric vehicle.

The electric motor, which is a rotating electric machine, includes a rotor 1, a stator 2, a frame 3, and a jacket 4. The stator 2 is arranged to surround an outer circumferential surface of the rotor 1 through a constant gap secured between the rotor 1 and the stator 2. The frame 3 surrounds an outer circumferential surface of the stator 2 to hold and fix the stator 2. The jacket 4 surrounds an outer circumferential surface of the frame 3 except for a lower portion of the frame 3 through a gap secured therebetween to form a passage for cooling water that is refrigerant, in cooperation with the frame 3.

The rotor 1 includes a shaft 5, a rotor core 6, and permanent magnets (not shown). The rotor core 6 is formed by laminating a plurality of steel plates and is fitted over the shaft 5. The permanent magnets are arranged on an outer circumferential surface of the rotor core 6 to form magnetic poles.

The stator 2 includes a stator core 8 having an annular shape and a stator coil 9 wound around the stator core 8.

The stator core 8 includes 3n (n is a positive integer) segment cores 10. The segment cores 10, each formed of the laminated steel plates, include a back yoke portion (not shown) having a circular arc-like shape, and a tooth 12 projecting radially inward from a circumferentially central portion of an inner circumferential surface of the back yoke portion toward a central axis line of the stator 2.

The stator coil 9 includes a plurality of U-phase coil portions 13 corresponding to a U-phase, a plurality of V-phase coil portions 14 corresponding to a V-phase, and a plurality of W-phase coil portions 15 corresponding to a W-phase.

Each of the U-phase coil portions 13, the V-phase coil portions 14, and the W-phase coil portions 15 is formed by a winding formed by concentrated winding around each of the teeth 12 of the segment cores 10 through an insulator 22 interposed therebetween. Each of the U-phase coil portions 13, the V-phase coil portions 14, and the W-phase coil portions 15 includes two coil terminals 16 projecting upward. The coil terminals 16 are both end portions of the winding, respectively corresponding to a winding start portion and a winding end portion of the winding.

Above the stator core 8, a hollow holder 17 having an annular shape is arranged. Inside the holder 17, a first busbar 18, a second busbar 19, and a third busbar 20, each having a ring-like shape, are arranged side by side in a radial direction. The first busbar 18, the second busbar 19, and the third busbar 20 are integrated with the holder 17 with an insulating resin that fills the holder 17.

A plurality of ferrous plates 24 having thermal conductivity are equiangularly arranged inside the holder 17 on the radially outer side of the busbars 18, 19, and 20. One end portion of each of the plurality of plates 24 is integrated with the holder 17 by the insulating resin that fills the holder 17. Another end portion of each of the plurality of plates 24 is exposed externally to be held in contact with an outer circumferential surface of the jacket 4.

Each of the coil terminals 16 of the U-phase coil portions 13, the V-phase coil portions 14, and the W-phase coil portions 15 is electrically connected to the first busbar 18, the second busbar 19, and the third busbar 20 through a connection portion 23.

Then, the U-phase coil portions 13, the V-phase coil portions 14, and the W-phase coil portions 15 are arranged in the order of, for example, the U-phase coil portion 13, the V-phase coil portion 14, and the W-phase coil portion 15 in a circumferential direction in the stator coil 9. The U-phase coil portions 13, the V-phase coil portions 14, and the W-phase coil portions 15 are connected in a delta-connection configuration to form a three-phase AC winding.

Figure 3:
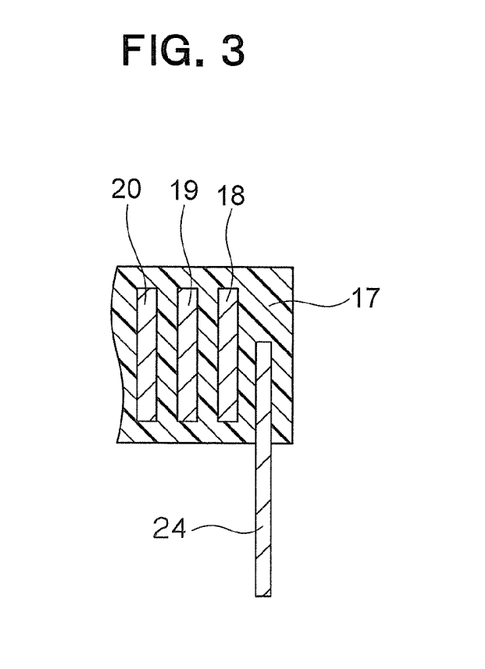
FIG. 3 is an enlarged view of a main part of FIG. 2.
Figure 4:
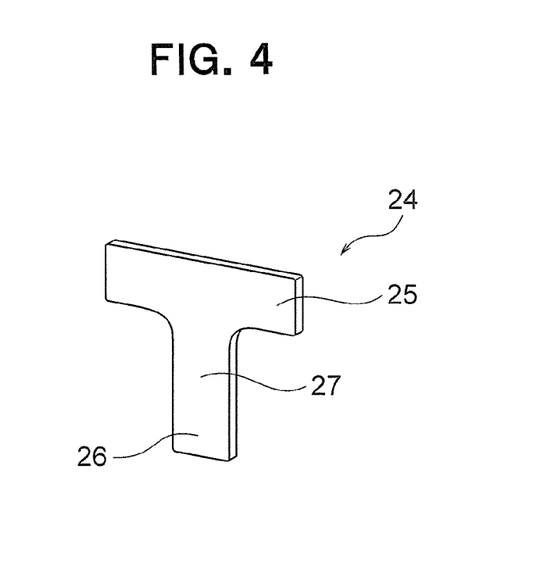
FIG. 4 is a perspective view for illustrating one of the plates illustrated in FIG. 2.

FIG. 3 is an enlarged view of a main part of FIG. 2, and FIG. 4 is a perspective view for illustrating one of the plates 24 illustrated in FIG. 2.

The plate 24 has a T-like shape. The plate 24 includes a heat-absorbing portion 25, a heat-dissipating portion 26, and a stress-relaxing portion 27. Both sides of the heat-absorbing portion 25 extend in the same direction as the circumferential direction in which the busbars 18, 19, and 20 extend while being opposed to the first busbar 18 in the radial direction. The heat-dissipating portion 26 is held in contact with the outer circumferential surface of the jacket 4. The stress-relaxing portion 27 connects the heat-dissipating portion 26 and the heat-absorbing portion 25 to each other.

In the electric motor according to the first embodiment described above, the busbars 18, 19, and 20 are energized through an intermediation of a power supply portion (not shown) to allow a current to flow through each of the U-phase coil portions 13, the V-phase coil portions 14, and the W-phase coil portions 15.

As a result, a rotating magnetic field is generated in the stator core 8. The rotating magnetic field attracts the rotor 1 to cause the rotor 1 to rotate. Further, the shaft 5 integrated with the rotor 1 also rotates, and hence a torque is transmitted to outside.

According to the electric motor of the first embodiment, the heat-absorbing portion 25 of the plate 24 extends in the same direction as the circumferential direction in which the busbars 18, 19, and 20 extend while being opposed to the first busbar 18 in the radial direction. Therefore, the area in which the heat-absorbing portion 25 and the first busbar 18 are opposed to each other increases. As a result, heat dissipation from the busbars 18, 19, and 20 is improved to achieve a higher output.

Further, the heat-dissipating portion 26 of the plate 24 is held in contact with the jacket 4, inside which cold water flows. Therefore, the plate 24 is actively cooled to further improve the heat dissipation from the busbars 18, 19, and 20.

Further, the plate 24 includes the stress-relaxing portion 27 having an elongated shape, which is arranged between the heat-dissipating portion 26 and the heat-absorbing portion 25. Therefore, a thermal stress, which is generated in the plate 24 due to a difference in linear expansion coefficient between the insulating resin that fills the holder 17 and the plate 24 that is a ferrous member, is relaxed by the stress-relaxing portion 27.

Further, the heat-absorbing portion 25 of the plate 24 radially faces the first busbar 18 that is located on an outermost diameter side among the plurality of busbars 18, 19, and 20 arranged side by side in the radial direction. Therefore, the heat-dissipating portion 26 can be directly brought into contact with the jacket 4 without bending the plate 24.

Further, the holder 17 is filled with the insulating resin. Therefore, an insulation distance is reliably secured between the heat-absorbing portion 25 of each of the plates 24 and the first busbar 18.

Figure 5:
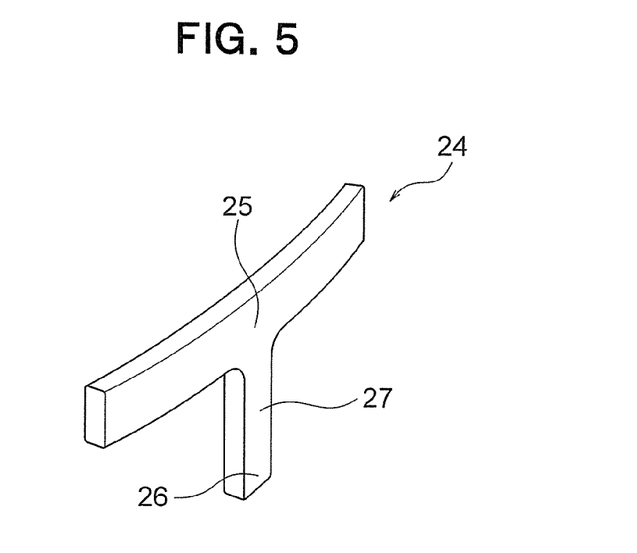
FIG. 5 is a perspective view for illustrating a modification of the plate according to a first embodiment of the present invention.

Alternatively, by further extending the heat-absorbing portion 25 of the plate 24 in the circumferential direction along the busbars 18, 19, and 20 in parallel thereto as illustrated in FIG. 5 in comparison with the heat-absorbing portion 25 illustrated in FIG. 4, the area in which the heat-absorbing portion 25 and the first busbar 18 are opposed to each other increases. As a result, heat-absorption performance of the heat-absorbing portion 25 can be further improved.

Figure 6:
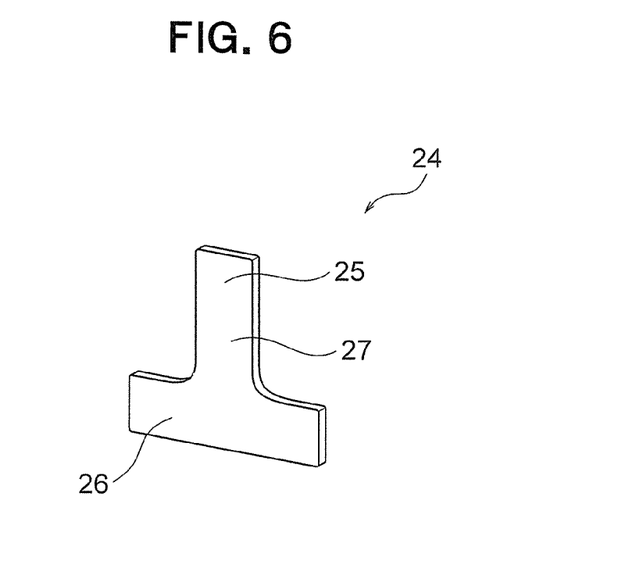
FIG. 6 is a perspective view for illustrating another modification of the plate according to a first embodiment of the present invention.

Further alternatively, as illustrated in FIG. 6, the plate 24 having a shape obtained by turning the T-like shape of the plate 24 illustrated in FIG. 4 upside down may also be used.

In this case, the area of the heat-dissipating portion 26 becomes larger than that of the heat-absorbing portion 25. Therefore, as compared with the plate 24 illustrated in FIG. 4, heat-dissipation performance of the heat-dissipating portion 26 is enhanced.

Figure 7:
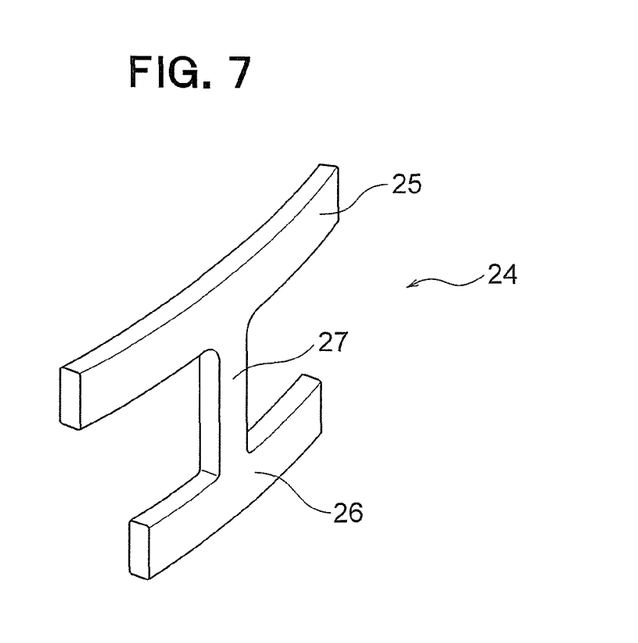
FIG. 7 is a perspective view for illustrating still another modification of the plate according to a first embodiment of the present invention.

Further alternatively, as illustrated in FIG. 7, the heat-absorbing portion 25 that is the one end portion of the plate 24 may be formed to have a circular arc-like shape with both ends of the heat-absorbing portion 25 extended in the circumferential direction along the busbars 18, 19, and 20 in parallel thereto. Further, the heat-dissipating portion 26 that is the another end portion of the plate 24 may also be formed to have a circular arc-like shape with both ends of the heat-dissipating portion 26 extended in the circumferential direction along the outer circumferential surface of the jacket 4.

In this case, the heat-absorption performance of the heat-absorbing portion 25 and the heat-dissipation performance of the heat-dissipating portion 26 are both enhanced to further increase the heat dissipation from the busbars 18, 19, and 20.

Second Embodiment

Figure 8:
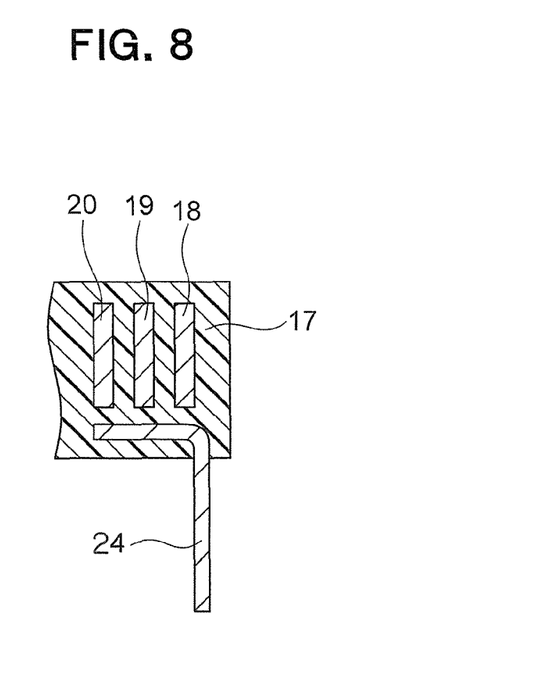
FIG. 8 is a perspective view for illustrating a main part of an electric motor according to a second embodiment of the present invention.
Figure 9:
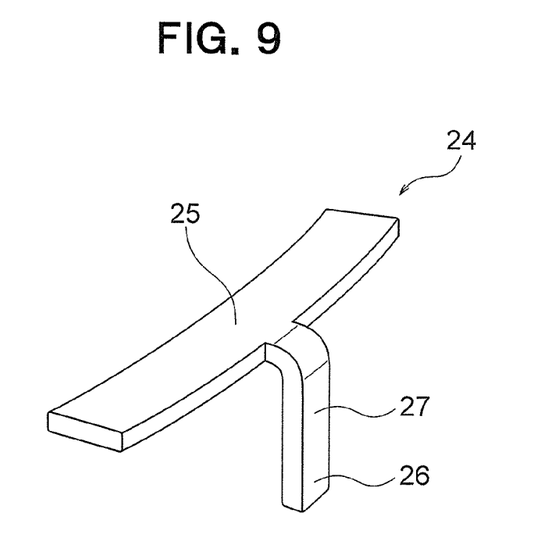
FIG. 9 is a perspective view for illustrating the plate illustrated in FIG. 8.

FIG. 8 is a sectional view for illustrating a main part of an electric motor according to a second embodiment of the present invention, and FIG. 9 is a perspective view for illustrating the plate 24 illustrated in FIG. 8.

In the second embodiment, an upper portion of the plate 24, that is, the heat-absorbing portion 25, which is the one end portion of the plate 24 having an L-like sectional shape, is bent by a right angle to be located below the busbars 18, 19, and 20 so as to face lower end surfaces of the busbars 18, 19, and 20 in an axial direction. Both sides of the heat-absorbing portion 25 extend in parallel to the busbars 18, 19, and 20 along the circumferential direction.

The remaining configuration is the same as that of the electric motor according to the first embodiment.

In the second embodiment, the same effects as those of the plate 24 according to the first embodiment can be obtained.

Further, the plate 24 according to the first embodiment includes the heat-absorbing portion 25 facing the first busbar 18 in the radial direction, whereas the plate 24 according to the second embodiment includes the heat-absorbing portion 25 facing the lower end surfaces of the busbars 18, 19, and 20 in the axial direction. Therefore, heat equally dissipates from each of the busbars 18, 19, and 20.

Figure 10:
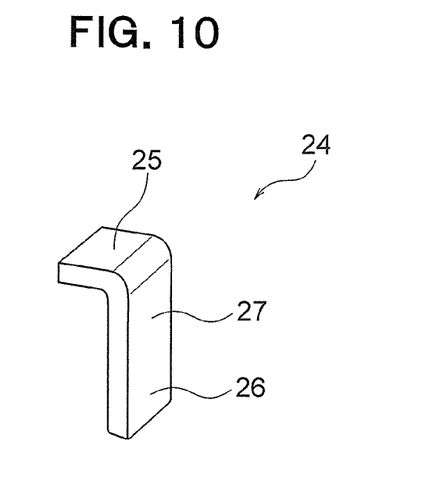
FIG. 10 is a perspective view for illustrating a modification of the plate according to a second embodiment of the present invention.

Alternatively, as illustrated in FIG. 10, the heat-absorbing portion 25, the stress-relaxing portion 27, and the heat-dissipating portion 26 of the plate 24 may have the same width.

In this case, a yield of a material of the plate 24 is improved to reduce manufacturing costs.

Although the three-phase brushless electric motor mounted in the vehicle has been described in each of the above-mentioned embodiments, it is apparent that the vehicle is merely an example. The three-phase brushless electric motor is mounted not only in the vehicle but may also be mounted in a home electric appliance and the like.

Further, although the stator coil 9 is the three-phase AC winding formed by connecting the U-phase coil portions 13, the V-phase coil portions 14, and the W-phase coil portions 15 in the delta-connection configuration, the U-phase coil portions 13, the V-phase coil portions 14, and the W-phase coil portions 15 may be connected in a Y-connection configuration.

Further, although the stator core 8 includes the plurality of segment cores 10, the stator core 8 may be an integral stator core.

Further, the one end portion of the plate 24 may be formed between the adjacent busbars, that is, between the busbars 18 and 19 or between the busbars 19 and 20 or may be formed so as to face the third busbar 20 on an innermost diameter side.

Further, although the busbars 18, 19, and 20 are arranged side by side in the radial direction, the electric motor may include the busbars 18, 19, and 20 arranged in the axial direction.

Further, although the lower end portion, which is the another end portion of the plate 24, is held in surface-contact with the outer surface of the jacket 4 inside which the cooling water flows, the lower end portion of the plate 24 may be separated away from the outer surface of the jacket 4.

The electric motor is not required to include the jacket 4. When the electric motor does not include the jacket 4, the lower portion, which is the another end portion of the plate 24, is exposed externally to be held in contact with the outer circumferential surface of the frame 3. Through the lower portion of the plate 24, the heat of the busbars 18, 19, and 20 is dissipated to outside air through the frame 3.

Further, the holder 17 is not required to be filled with the insulating resin.

Further, the present invention is also applicable to a power generator that is a rotating electric machine.

What is claimed is:

1. A rotating electric machine, comprising:
    a stator core arranged to surround an outer circumferential surface of a rotor;
    a frame having an annular shape arranged to surround the stator core;
    coil portions of a plurality of phases, which are wound around the stator core;
    a plurality of busbars arranged on one end surface side of the stator core over an entire circumference thereof, which are to be electrically connected to the coil portions of the plurality of phases to distribute electric power to the coil portions of the plurality of phases;
    a holder accommodating the plurality of busbars inside of the holder; and
    a plate having one end portion inside of the holder and facing at least one of the plurality of busbars and another end portion exposed externally from the holder on an outer diameter side of the frame,
    the plate guiding heat of the plurality of busbars from the one end portion to the another end portion.

2. A rotating electric machine according to claim 1, wherein the one end portion of the plate faces the busbar on an outermost diameter side among the plurality of busbars arranged side by side in a radial direction.

3. A rotating electric machine according to claim 2, wherein the one end portion of the plate has a circular arc-like shape with both sides extending in a circumferential direction along the plurality of busbars in parallel thereto.

4. A rotating electric machine according to claim 1, wherein the one end portion of the plate has an L-like sectional shape facing each end surface of the plurality of busbars arranged side by side in the radial direction.

5. A rotating electric machine according to claim 4, wherein the one end portion of the plate has a circular arc-like shape with both sides extending in a circumferential direction along the plurality of busbars in parallel thereto.

6. A rotating electric machine according to claim 1, further comprising a jacket arranged to surround an outer circumferential surface of the frame with a gap formed between the frame and the jacket, through which refrigerant flows.

7. A rotating electric machine according to claim 6, wherein the another end portion of the plate is held in contact with an outer circumferential surface of the jacket.

8. A rotating electric machine according to claim 7, wherein the another end portion of the plate has a circular arc-like shape with both sides extending in the circumferential direction along the outer circumferential surface of the jacket.

9. A rotating electric machine according to claim 1, wherein the holder is hollow, and a hollow space in the holder is filled with an insulating resin.

10. A rotating electric machine according to claim 1, wherein the rotating electric machine comprises an inner-rotor type three-phase brushless electric motor to be mounted in a vehicle.

* * * * *